Fig. 1

INVENTOR.
Walter G. Kniffin
BY
Carl A Stickel
HIS ATTORNEY

March 14, 1967 W. G. KNIFFIN 3,308,631
FLEXIBLE TRAY ICE MAKER
Filed June 1, 1964 7 Sheets-Sheet 4

INVENTOR.
Walter G. Kniffin
BY
Carl A. Stickel
HIS ATTORNEY

March 14, 1967  W. G. KNIFFIN  3,308,631
FLEXIBLE TRAY ICE MAKER
Filed June 1, 1964  7 Sheets-Sheet 6

| CAM POSITION 135 | CONTACTS 177 | 169 | 173 | 181 | MOTOR 159 | WATER VALVE 191 | RELAY 298 | |
|---|---|---|---|---|---|---|---|---|
| 182° | Cl | Cl | Cl | Op | ON | ON | Op | WATER FILL BEGINS. |
| 194° | Cl | Cl | Cl | Op | ON | ON | Op | TRAY HORIZONTAL, CLOCKWISE RETURN ENDS, WATER FILL CONTINUES. |
| 253° | Cl | Cl | Op | Op | ON | OFF | Op | WATER FILL ENDS AFTER 15 SECONDS. |
| 270° | Cl | Cl | Op | Op | ON | OFF | Op | START DISTRIBUTION 7° WIGGLE. |
| 330° | Cl | Cl | Op | Op | ON | OFF | Op | END DISTRIBUTION 7° WIGGLE. |
| 345° | Cl | Cl | Op | Cl | ON | OFF | Op | TRANSFORMER ENERGIZES DETECTOR SYSTEM IF BIN SWITCH IS CLOSED. |
| 353° 359° DRIFT | Cl | Op | Op | Cl | OFF | OFF | Op | MOTOR STOPS FOR FREEZING OF LIQUID. MOTOR DOES NOT START UNTIL THERMISTOR TEMP. IS REDUCED TO 21°-3°F. |
| 0° | Cl | Op | Op | Cl | ON | OFF | Cl | WHEN ICE FROZEN, RELAY IS ENERGIZED. CLOCKWISE TWIST BEGINS. |
| 32° | Cl | Cl | Op | Cl | ON | OFF | Cl | RELAY CONTACTS SHUNTED. |
| 35° | Cl | Cl | Op | Op | ON | OFF | Op | DETECTOR SYSTEM DEENERGIZED. |
| 50° | Cl | Cl | Op | Op | ON | OFF | Op | CLOCKWISE TWIST AT 23° LIMIT. CN'TR-CLK'W. 23° MOVEMENT STARTS. |
| 64° | Cl | Cl | Op | Op | ON | OFF | Op | TRAY HORIZONTAL - COUNTER CLOCKWISE TILT BEGINS. |
| 70° | Cl | Cl | Op | Op | ON | OFF | Op | BIN SWITCH IS OPENED. COUNTER CLOCKWISE TILT CONTINUES. |
| 150° | Cl | Cl | Op | Op | ON | OFF | Op | MAXIMUM COUNTER CLOCKWISE TWIST (117°-90°=27° NET). CLOCKWISE 27° RETURN BEGINS. ICE CUBES EJECTED. |
| 166° | Cl | Cl | Op | Op | ON | OFF | Op | BIN SWITCH RECLOSED. CLOCKWISE RETURN CONTINUES. |
| 182° | Cl | Cl | Cl | Op | ON | ON | Op | WATER FILL BEGINS. |

Cl = Closed
Op = Open

Fig. 13

INVENTOR.
Walter G. Kniffin
BY Carl A. Stickel
HIS ATTORNEY

March 14, 1967  W. G. KNIFFIN  3,308,631
FLEXIBLE TRAY ICE MAKER
Filed June 1, 1964  7 Sheets-Sheet 7

INVENTOR.
Walter G. Kniffin
BY
Carl A. Stickel
HIS ATTORNEY

_United States Patent Office_

3,308,631
Patented Mar. 14, 1967

3,308,631
FLEXIBLE TRAY ICE MAKER
Walter G. Kniffin, Dayton, Ohio, assignor to General Motors Corporation, Detroit, Mich., a corporation of Delaware
Filed June 1, 1964, Ser. No. 371,588
8 Claims. (Cl. 62—137)

This invention pertains to automatic freezers and more particularly to an automatic machine for installation in a household refrigerator which will automatically maintain a reserve supply of ice cubes.

While large ice makers for restaurants have been commercially successful, there has been little success with small automatic ice makers for household refrigerators. Difficulties have been encountered securing reliability of operation under all conditions, combined with low cost and adequate capacity. Some systems imposed a greater refrigeration load than could be handled by the refrigerating system on hot days. Some systems had difficulty in providing adequate life for the tray or belt or other liquid holding devices. The twisting of some trays caused them to acquire a permanent set. Some had difficulty with the freezing of ice between parts. The underwriters' requirements for electrical safety added to the difficulties.

It is an object of this invention to provide an automatic freezer of the tray type in which means are provided for assisting in providing uniform filling of all compartments of the tray.

It is another object of this invention to provide an automatic freezer of the tray type in which there are weirs at the intersection of the walls to distribute the water fill so arranged to minimize the size of the ice bridges and in which the ice bridges between the cubes extending through the weirs are arranged to facilitate the object of the ice blocks from the tray at the proper time.

It is another object of this invention to provide an automatic freezer of the tray type in which a safe, reliable, low voltage detection system is provided for detecting completion of freezing and initiating ejection of the ice blocks.

It is another object of this invention to provide an automatic freezer of the tray type in which a reliable arrangement is provided for stopping the machine when the ice collecting bin is filled and which tests the operation of the operation of the bin control system during a portion of each cycle.

It is another object of this invention to provide an automatic freezer of the tray type in which the tray can be readily removed without removing other substantial parts of the apparatus and without removing the ice maker from the refrigerator.

These and other objects are attained in the form shown in the drawings in which a frame is mounted in the freezing compartment of a refrigerator in the path of the air circulating at below water freezing temperatures. The frame provides a pivotal support for a flexible plastic tray and also provides means for limiting the counterclockwise rotation of the pivoted end of the tray from a horizontal position. A motor and drive mechanism is provided for the driven end of the tray which twists the driven end of the tray first clockwise 22° and thence reverses the direction until the tray is turned counterclockwise 132° and then given an additional 27° twist to eject the ice blocks from the tray for collection in a bin. The bin is resiliently mounted so that when it is substantially filled with ice blocks through an arrangement for detecting the deflection of the bin, the ice making machine or automatic freezer is stopped. The tray is provided with a time controlled amount of water, or other liquid to be frozen by the same timing drive mechanism which is used to twist the tray. The tray is provided with peculiarly shaped weirs at the intersections of the walls of the compartments which are shaped to minimize the size of the ice bridges extending through the weirs between the frozen cubes so that they can be readily broken and also be effectively used to help in the ejection of the ice blocks from the tray during the final twisting operation. An improved low voltage detection circuit is provided for detecting the completion of the freezing of the liquid in the tray by a sensitive thermal control device on the tray. The detecting device, mounted on the tray, has a convenient removable plug connection with the remainder of the detector circuit. This control is used to terminate the freezing of the ice blocks and initiating the loosening and ejection of the ice blocks from the tray. The tray is provided with a removable pivotal mounting at the rear arranged so that it can be readily unfastened at the rear and removed from the rear pivot. The circuit is primarily made up of a printed circuit board containing miniaturized electrical parts.

In a modified form of the invention, the tray has compartments with cylindrical walls of the type illustrated in applicant's Patent No. 3,075,364 issued January 29, 1963. In this form, a stationary ejection finger is provided which is located in the path of the ice block when the tray is turned from the horizontal to the vertical position. This causes a force to be applied directly to the ice block to cause it to be swept out of the mold.

Further objects and advantages of the present invention will be apparent from the following description, reference being had to the accompanying drawings wherein a preferred embodiment of the present invention is clearly shown.

Figure 1:
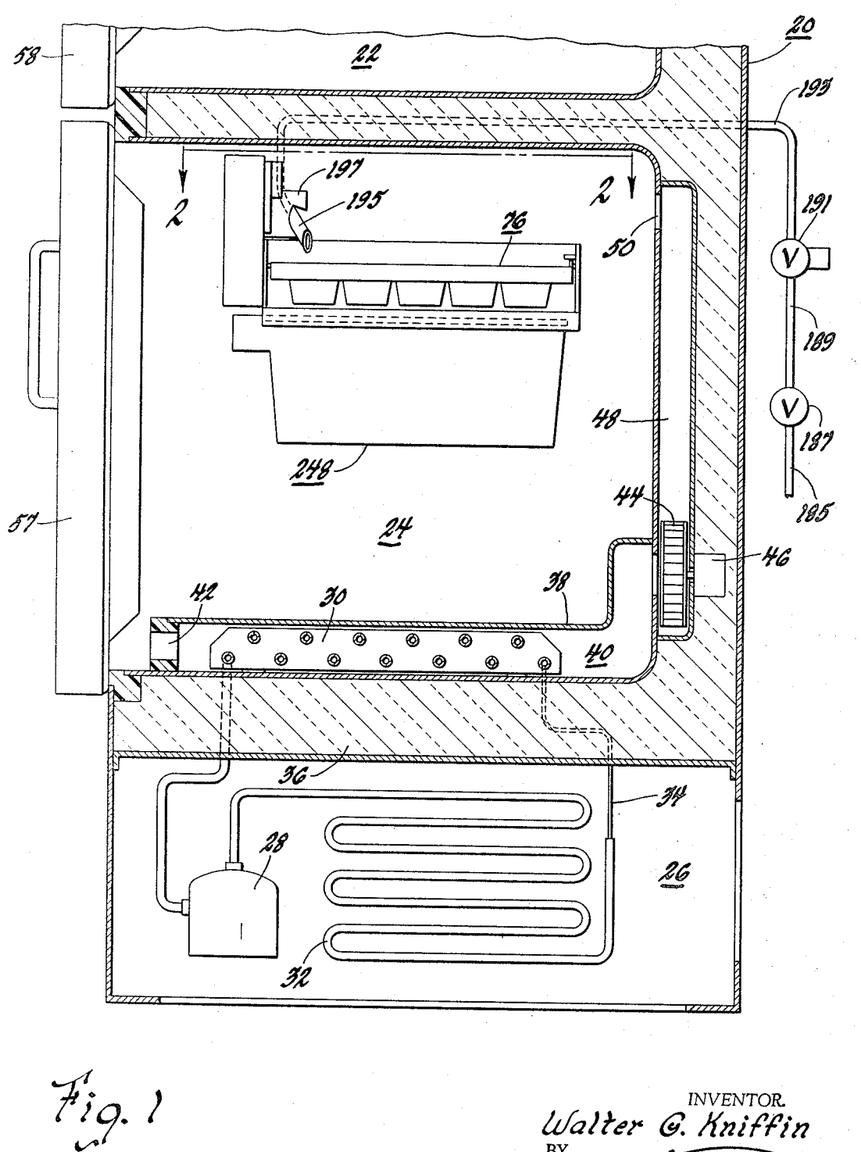
FIGURE 1 is a vertical sectional view through the lower portion of a household refrigerator illustrating an automatic freezer embodying my invention.

Referring now to the drawings and more particularly to FIGURE 1, there is shown a household refrigerator 20 having an upper above freezing compartment 22, a lower below freezing compartment 24 and a machinery compartment 26 beneath the bottom insulated wall of the below freezing compartment 24. In the machinery compartment 26 is a sealed motor compressor unit 28 which withdraws evaporated refrigerant from the tube and fin evaporator 30 and compresses the evaporated refrigerant and forwards the compressed refrigerant to a condenser 32 from which the liquefied refrigerant passes through a restricter expansion device 34 to the evaporator 30. The evaporator 30 is located between the bottom insulated wall 36 and the false bottom wall 38 between which there is formed an evaporator chamber 40 through which air is drawn from the compartment 24 through the entrance 42 into heat transfer relation with the evaporator 30 by a centrifugal fan 44 driven by an electric motor 46. The fan 44 discharges the air upwardly through a duct 48 on the rear wall of the compartment 24 from which the cold air is delivered through an opening 50 over the freezing tray 76 of the ice maker 54. The compartments 24 and 22 are closed by the insulated doors 57 and 58. The refrigerating system is operated so as to keep the evaporator 30 at a relatively cold temperature such as between about +5 and −10° F. This makes it possible to deliver cold dry air to the compartment 24 sufficient to keep the compartment 24 between the temperatures of +11 and −2° F. The refrigerator may for example be like that shown in Patent 2,912,834 issued November 17, 1959.

The automatic freezer or ice maker 54 is provided with a sheetmetal frame 56 which is mounted on the side wall of the freezing compartment 24.

The frame 56 includes a side portion 58 fastened by screws to the side wall and fastened at the front by screws to the housing 60 of the drive mechanism. The rear 62 of the frame connects the side 58 with the opposite side 64 which at the front is connected by screws to the housing 60. As better shown in FIGURE 6, the rear end 62 is provided with an offset projection 66 having an aperture aligned with an aperture in the rear end 62 to provide a straddle mounting for the pivot pin 68. The pivot pin has its head in front of the projection 66 so that it is readily removable. It is normally held in place by a wire spring 70 having one end pressing against the head of the pivot pin 68 and having its opposite end held by the rear 62. Between these two aligned apertures, the pivot pin passes also through an opening in the end bracket 72 which is fastened by the screws 74 to the rear end of a 15-compartment plastic tray 76. This plastic tray may be made of high density polyethylene or other suitable material to which frozen liquids and particularly ice will not readily adhere to.

Figures 2, 3, 4, 5:
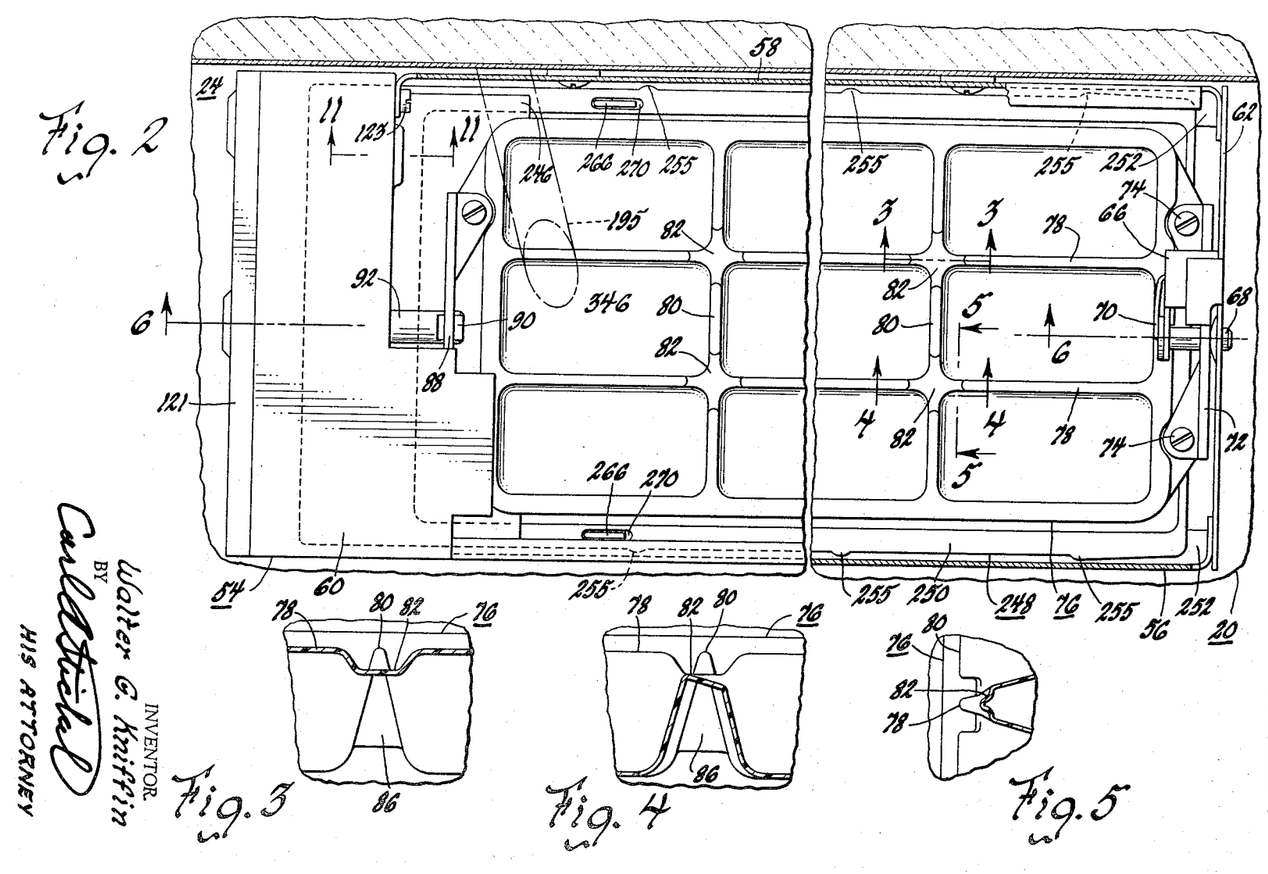
FIGURE 2 is a top view of the automatic freezer taken along the line 2—2 of FIGURE 1.
FIGURE 3 is a longitudinal fragmentary vertical sectional view of a portion of the ice tray shown in FIGURE 2, taken along the line 3—3 thereof.
FIGURE 4 is a longitudinal fragmentary vertical sectional view of another portion of a tray shown in FIGURE 2, taken along the line 4—4 thereof.
FIGURE 5 is a transverse fragmentary vertical sectional view of another portion of the freezing tray shown in FIGURE 2, taken along the line 5—5 thereof.

The tray 76 is preferably three compartments wide and 5 compartments long. It includes the longitudinal dividing walls 78 and the transverse dividing walls 80 which divide the interior of the tray into 15 compartments. To make it easy to equalize the distribution of liquid or water in the compartments of the tray, weirs 82 are provided at each of the intersections of the walls 78 and 80. The sectional views of the weirs shown in FIGURES 3, 4 and 5 shows their configurations which are designed to minimize the meniscus effect so as to reduce the liquid level required to fill all the compartments to minimize the formation of an ice bridge between the cubes. As shown in FIGURE 3, the weir 82 is depressed and has a substantially straight longitudinal line but as shown in FIGURE 4 the surface of the weir on opposite sides of the section illustrated in FIGURE 3 has a slope to the rear. The transverse section of the weir shown in FIGURE 5 illustrates a narrow ridge appearing in the transverse section of the weir. This arrangement makes it possible to supply sufficient liquid or water to the compartments at one end for the distribution of the water through the weirs 82 until they are substantially uniformly filled. This, of course, requires that the level be sufficiently higher than the weirs to effect the equal distribution. As soon as this is accomplished, the supply is shut off.

Figures 14, 15, 16:
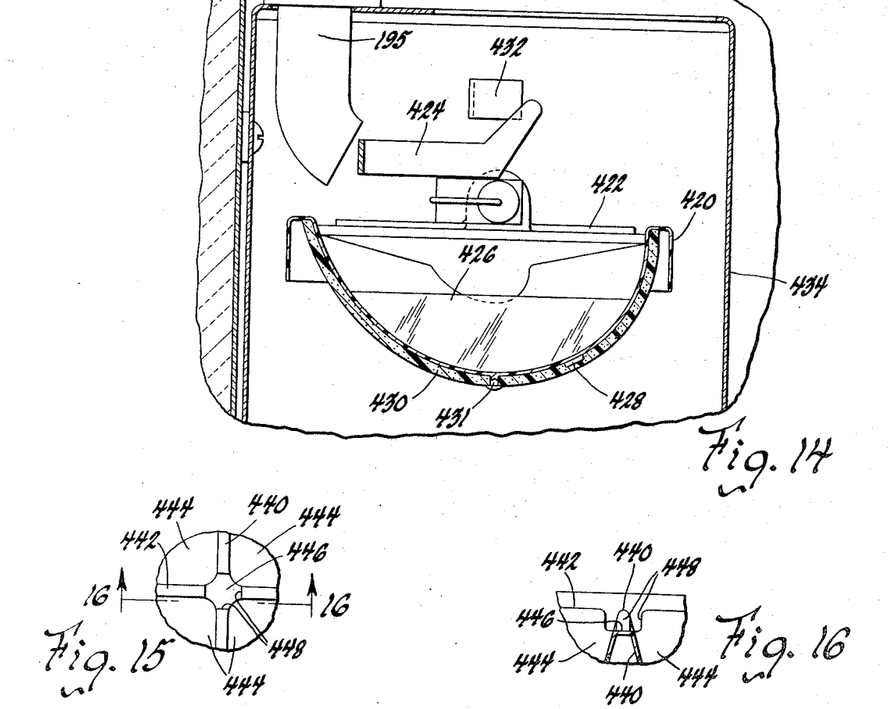
FIGURE 14 is a transverse fragmentary vertical sectional view showing a modified form of automatic freezer provided with a stationary frozen block ejecting finger.
FIGURE 15 is a fragmentary plan view of an intersection in the walls of a tray showing a modified form of weir.
FIGURE 16 is a fragmentary vertical sectional view taken along the line 16—16 of FIGURE 15.

In FIGURES 15 to 20 are illustrated modified forms of weirs which through the use of sharp corners and raised ridges provide points of weakness in the ice bridges where stress concentration will facilitate breakage of the cubes from the ice bridges. In FIGURES 15 and 16 the walls 440 and 442 separating the compartments 444 are provided with a weir 446 at each of the intersections of the walls of a tray similar to that shown in FIGURE 2. As shown, this weir 446 is located a substantial distance below the top of the walls 440 and 442, and has a substantially flat top with sharp edges meeting the intersections of the walls 440 and 442. The portions of the walls extending immediately upwardly from the weir 446 are provided with flat vertical ends 448 having sharp vertical corners. The sharp edges of the weir 446 together with the sharp edges on the flat ends 448 provide lines of weakness between the ice cubes in the pockets 444 and ice bridges extending through the weir 446 connecting the frozen cubes. When the tray is twisted, the connection between the ice cubes and the ice bridges are readily broken upon the lines made by the sharp edges. This facilitates separation of the cubs when the cubes are ejected from the trays.

Figure 17:
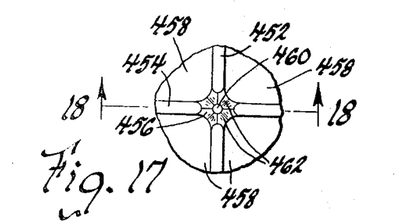
FIGURE 17 is a fragmentary plan view of a third form of weir.
Figure 18:
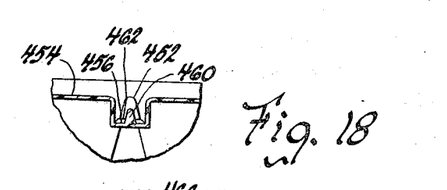
FIGURE 18 is a fragmentary vertical sectional view taken along the line 18—18 of FIGURE 17.

In the form shown in FIGURES 17 and 18, the separating walls 452 and 454 are provided with rounded ends extending upwardly from the weir 456. To provide lines of weakness in the ice bridges extending through the weir 456 connecting the ice cubes in the pockets 458, the weir 456 is provided with a centrally upwardly extending projection 460. To further weaken the ice bridges, raised ridges 462 at a 45° angle to the walls are provided on the surface of the weir 456 extending from the projection 460 bisecting the angle between the separating walls 452 and 454 as indicated in FIGURE 17. These ridges 462 therefore provide lines of weakness at which the breaking stress is concentrated so that the ice bridges extending through the weir 456 between the cubes in the pockets 458 are readily broken.

Figure 19:
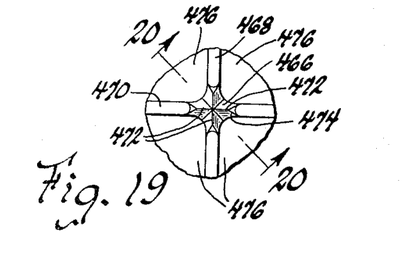
FIGURE 19 is a fragmentary plan view of a fourth form of weir.
Figure 20:
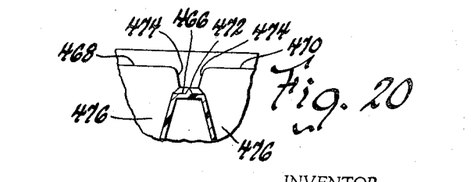
FIGURE 20 is a fragmentary vertical sectional view taken along the line 20—20 of FIGURE 19.

In the form shown in FIGURES 19 and 20, the weir 466 between the separating walls 468 and 470 is provided with raised ribs 472 in alignment with the walls 468 and 470. The ends 474 of the walls 468 and 470 extending above the weir 466 are provided with sharp vertical edges similar to the bow of a ship extending upwardly from the raised portions 472 to provide lines of weakness in the ice bridges extending through the weir 466 connecting the ice cubes in the pockets 476. By virtue of these sharp edges, the ice bridges extending through the weir 466 connecting the cubes in the pockets 476 are readily broken adjacent the ribs 472 and the sharp vertical edges 474 to facilitate the separation and ejection of the cubes during the inverting and final twisting of the tray. Thus by these arrangements, the tray can be filled through the weirs from one discharge spout and after its contents are frozen, the ice bridges extending through the weirs are readily broken before the frozen cubes are discharged into the bin.

After freezing of the liquid, the frozen liquid forms bridges extending through the weirs 82 between the cubes formed in the 15 pockets. The weirs 82 are so designed that a minimum of liquid is required to accomplish this. The bridges extending between the cubes through the weirs are readily broken when the tray is twisted and also assist in the ejection of the cubes during the twisting operation. The transverse walls 80 are also provided with longitudinally extending stiffening webs 86 which are of the same material as the remaining parts of the tray 76 and extend directly between the wall portions 80 of adjacent pockets. These webs 86 assure a substantially uniform twisting of the tray 76 from end to end for facilitating the ejection of the cubes from the pockets thereof. The opposite end of the tray 76 is fastened by screws to a metal tray supporting bracket 88 provided with an aperture having flat sides for engaging the flat sided end 90 of the tray drive shaft 92. This tray drive shaft 92 is rotatably mounted in a bearing 94 provided in the drive mechanism housing 60. The opposite end of the tray drive shaft 92 has fixed thereon a pinion 96 beyond which the shaft 92 is rotatably mounted in a second bearing 98 provided in the housing cover 121. The housing cover 121 is fastened to the housing 60 by suitable screws 123 located at the corners. These screws may also be used for connecting the housing 60 to the sheetmetal frame 56. The pinion 96 is continuously meshed with the sector gear teeth 125 on the adjacent end of the sector gear member 127 pivoted at the opposite end on the pin 129 to the housing 60. The sector gear member 127 is provided with a pin and roller follower 131 extending into the irregular cam groove 133 of the cam 135. The cam 135 has a gear toothed periphery and a central bearing 137 which is rotatably mounted on a pin 139 which is held in an aperture in the housing 60 and a recess in the cover 121. The periphery of the cam 135 is provided with the gear teeth 141 which are continuously enmeshed with a pinion 143 fixed to a gear 145. The gear 145 meshes with a pinion 147 fixed to a gear 149 which in turn meshes with a pinion 151 fixed to a gear 153 meshing with a pinion 155 on the shaft of the rotor 157 of a miniature electric motor. This gear reduction between the rotor 157 and the periphery of the cam 135 assures that sufficient power will be applied to the cam 135 to twist the tray 76 even when the tray is filled with ice cubes. The rotor 157 is magnetically associated with a synchronous clock-type shaded pole stator 159 which is mounted on the housing 60. The rotor 157 as well as the reduction gearing 155 to 147, inclusive, are rotatably mounted in bearings provided in a bearing plate 161 and the housing 60.

Figures 6, 7:
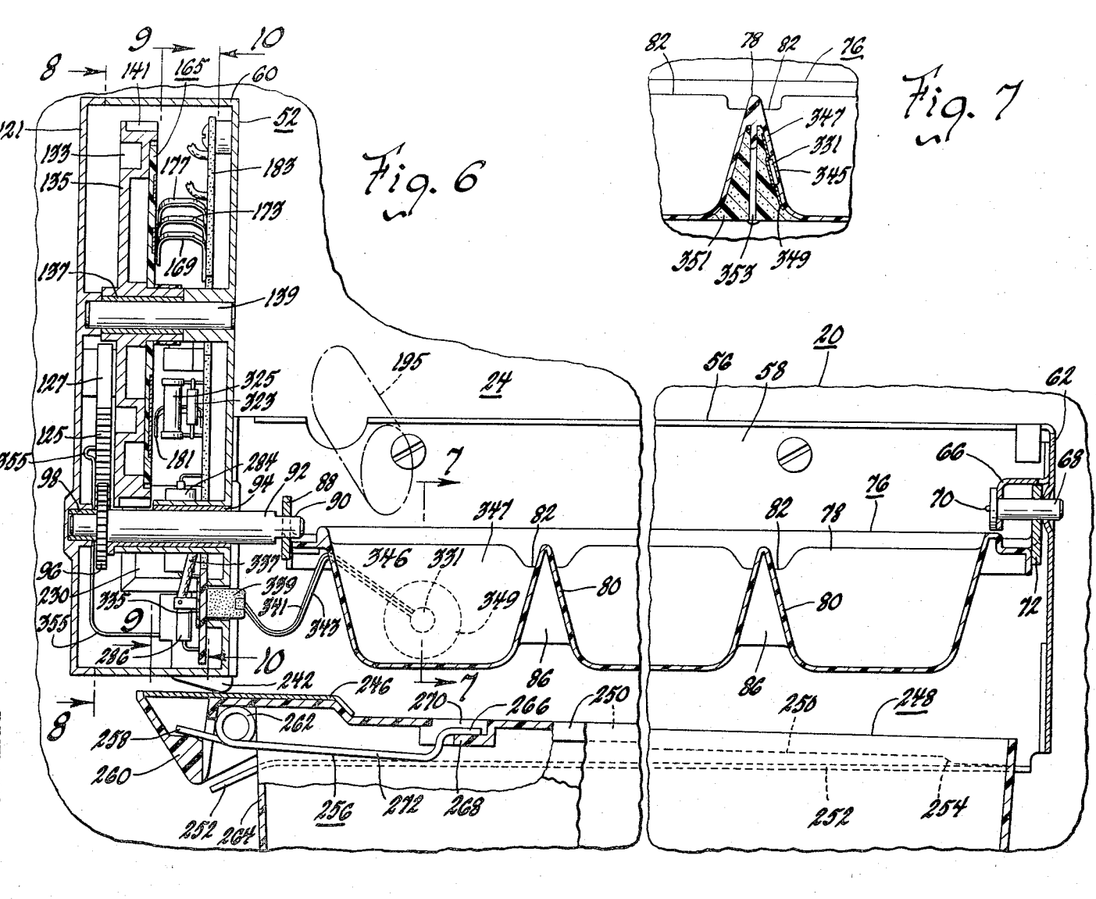
FIGURE 6 is a longitudinal vertical sectional view taken along the line 6—6 of FIGURE 2.
FIGURE 7 is a fragmentary transverse vertical sectional view taken along the line 7—7 of FIGURE 6.
Figure 8:
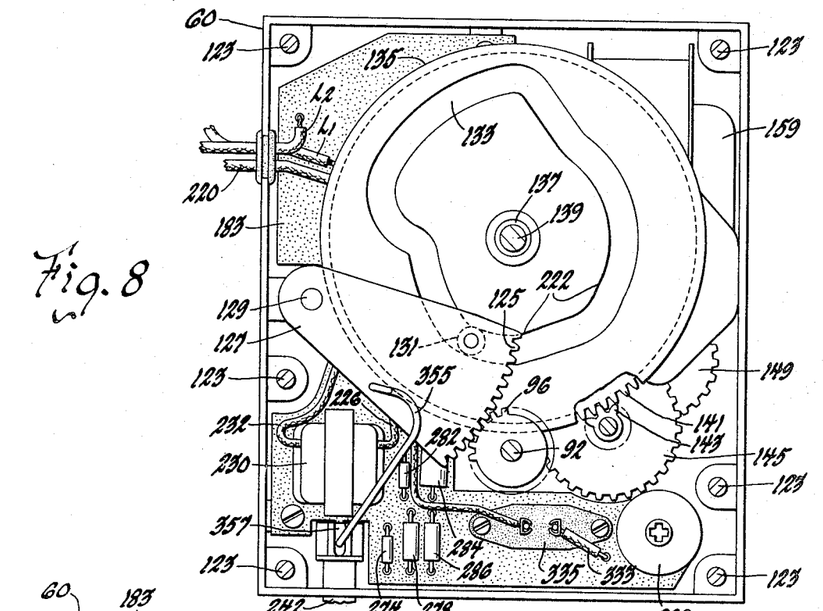
FIGURE 8 is a transverse vertical sectional view taken along the lines 8—8 of the drive mechanism of the ice maker shown in FIGURE 6.

The motor 157, 159 is started after the tray 76 is filled with the liquid to be frozen and freezing has been completed. The starting position is shown in FIGURE 8. In the first 50° of clockwise rotation of the cam 135, the sector gear 127 is lifted until the shaft 92 is turned 23° clockwise. The rear end of the tray 76 is prevented from clockwise rotation by the engagement of the tray end 72 with the projection 66. This prevents any clockwise rotation away from the horizontal of the rear end of the tray 76 about the pivot pin 68. The clockwise rotation of the tray shaft 92 therefore results in the 23° clockwise rotation of the front bracket 88 and the front end of the tray 76 resulting in a uniform helical twisting of the tray 76 because of its construction with the webs 86 between the transverse walls 80 as shown in FIGURE 6. This results in the loosening and lifting of the frozen cubes from the pockets in the tray 76. The frozen liquid in the weirs 82 assists in lifting the frozen cubes out of the pockets. The frozen bridges extending between the cubes through the weirs are also broken by this twisting.

The cam then provides through the next 100° of its rotation a counterclockwise rotation of the shaft 92 through 160°. The first 23° of rotation of tray shaft 92 returns the front end of the tray 76 to the horizontal position. The following 110° of rotation of the shaft 92 turns the entire tray 110° counterclockwise to a beyond vertical position for dumping the frozen cubes therefrom. The rear end of the tray 76 and its support 72 rotate freely through this 110° counterclockwise rotation. At the end of this 110° counterclockwise rotation, the rear tray support 72 engages a projection 163 which stops its counterclockwise rotation. The shaft 92 and the front tray support 88 as well as the front end of the tray 76 continues the counterclockwise rotation until the high point of the cam reaches the roller follower 131 at a point 150° from the starting point. The lift of the cam 135 is sufficient to provide 27° of counterclockwise movement after the rear end of the tray 76 engages the stop 163 so that the tray 76 is given a 27° counterclockwise uniform helical twist. This is not only sufficient to assure the ejection of the frozen cubes from the pockets of the tray 76, but it also gives the tray 76 a sufficient counterclockwise twist to counteract any set which may be put into the tray 76 during the initial clockwise twisting thereof. The rotation of the cam 135 for the next 44° (between 150° and 194° of its rotation from start) rotates shaft 92 to return it 137° to horizontal. The tray 76 comes to rest against stop 66 substantially horizontal and free from twist.

Figures 10, 11, 12:
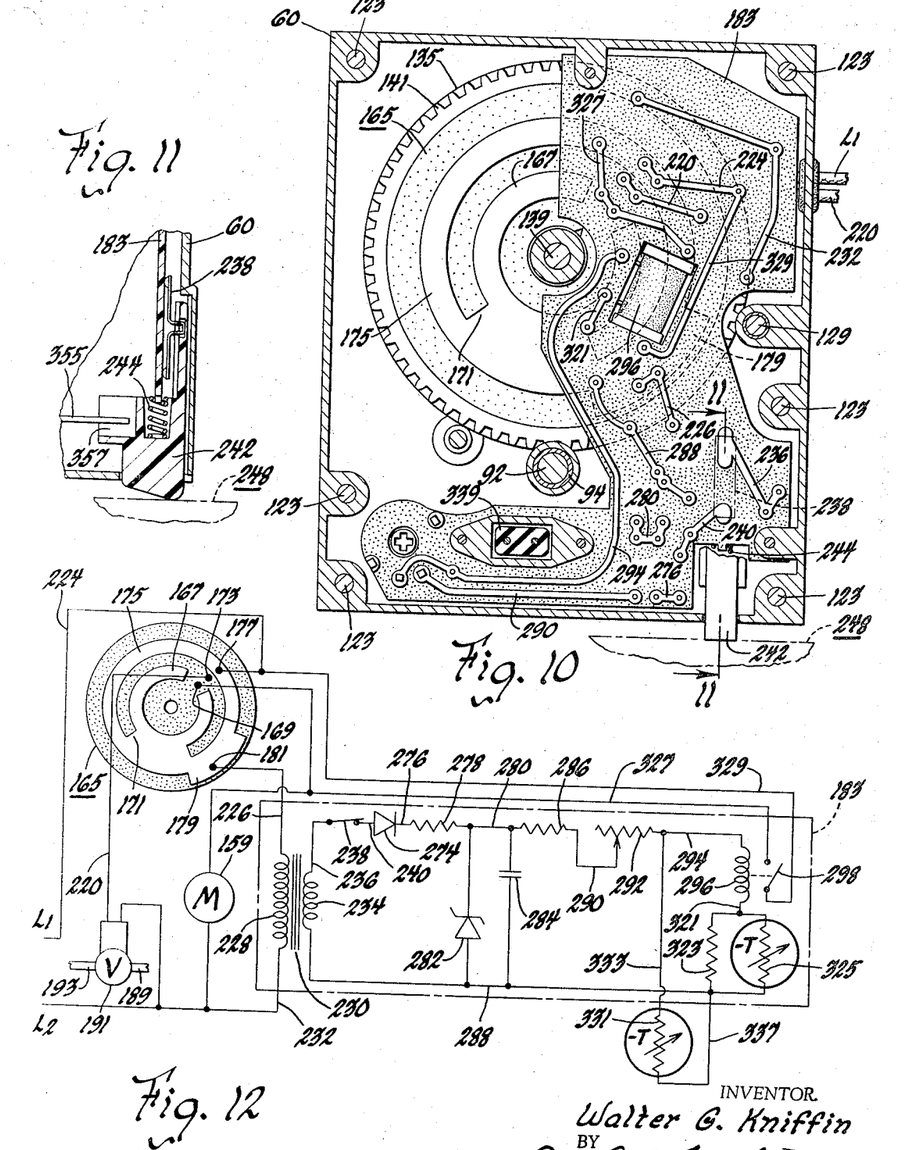
FIGURE 10 is a transverse fragmentary vertical sectional view taken along the line 10—10 of FIGURE 6 illustrating the printed circuit board and its electrical components.
FIGURE 11 is a longitudinal fragmentary sectional view taken along the line 11—11 of FIGURE 10.
FIGURE 12 is a wiring diagram for the system.

The automatic operation of the ice maker is synchronized through the cam 135. This is accomplished by providing a timing commutator 165 locked to its opposite face in an established orientation. The configuration of this commutator is illustrated in FIGURES 10 and 12. The unshaded portions in FIGURE 12 illustrate the conductive area of the commutator 165. This includes an inner conductor ring segment 167 adapted to cooperate with a spring contact 169, a second conducting area, or fragment of a ring 171 adapted to contact with a spring contact 173, a third continuous conducting ring 175 adapted to contact with a spring contact 177 and a fourth fragment of conducting ring 179 adapted to be contacted by the spring contact 181. These C-shaped spring contacts 169, 173, and 177 are located close together in alignment as illustrated in FIGURE 6 and are mounted on the front face of a printed circuit board 183 as shown in FIGURE 6. This printed circuit board 183 is fastened by screws to the housing 60 as shown in FIGURE 6. The spring contact 181 is similar in shape and is similarly mounted on the printed circuit board 183 but is located approximately 93° in a counterclockwise direction from the contacts 169, 173, and 177.

Figure 13:
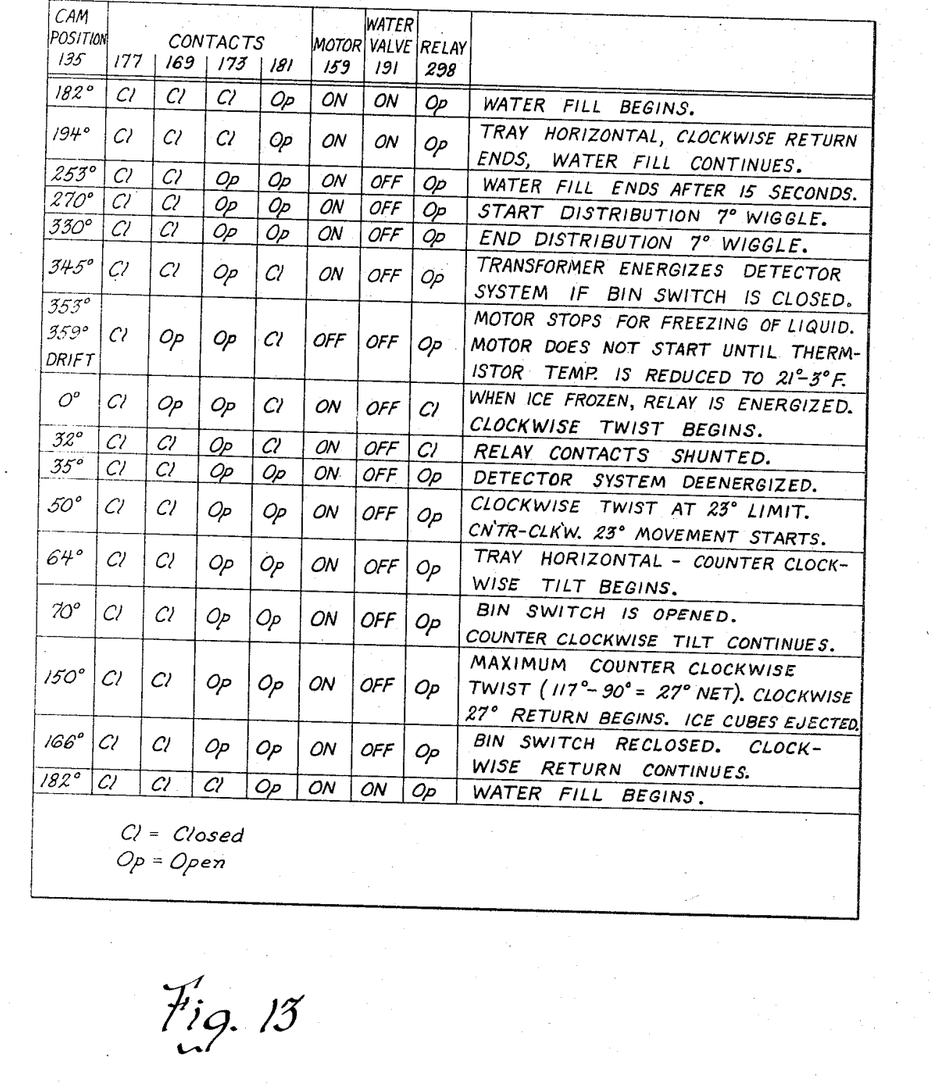
FIGURE 13 is an operation chart for the automatic freezer shown in FIGURES 1 to 12.

The water or liquid supply to be frozen is supplied through a supply pipe 185 and a manual control valve 187 and the pipe 189 to a solenoid valve 191 which controls the flow through the insulated pipe 193 to a plastic fill tube 195 extending over the tray 76 and supported by a bracket 197 fastened to the drive mechanism housing 60. The solenoid valve 191 has one conductor 199 normally connected to the supply conductor L–2 which is from a ground potential source. The second terminal of the valve 191 is connected by a conductor 220 to the spring contact 173 cooperating with the No. 2 conductor ring segment 171. This is oriented with the cam 135 so that the water fill begins when the cam 135 is rotated about 194° from the starting point. This, of course, is following the ejection of the frozen cubes and the return of the tray 76 to the horizontal position. The times when the various operations take place are set forth on the chart in FIGURE 13. In this chart the indication "CC" stands for Closed Conditions of the contacts 177, 169, 173 and 181. The indication "OP" stands for an Open Circuit Condition for these contacts. The indication "ON" is also used to indicate operation of the motor 159 and opening the water valve 191 while "OFF" indicates stopping of the motor and the closing of the valve. Indications "ON" and "OFF" are also used to indicate the open and closed position of the water valve. These are combined with corresponding cam positions to provide a comprehensive indication of the operation of the system.

The water fill continues for about 15 seconds through an angle of approximately 59° of cam rotation while the contact 173 is in engagement with the conductive portion of the No. 2 contact ring segment 171. When the contact segment 171 leaves the contact 173, the circuit to the water valve 191 is broken and water flow to the tray 76 ceases. The water fill period is timed through the operation of the synchronous motor which through the cam 135 rotates the conducting part of the conductor segment 171 of the commutator 165 over and off the contact 173. The length of the conducting part of the strip 171 is made just long enough to provide exactly the correct amount of time for liquid flow to the tray sufficient to cause the liquid entering the front middle compartment to flow through the weirs 82 to fill all the remaining compartments of the tray 76. This amount is kept at a minimum so as to minimize the amount of liquid remaining at the weirs which will provide frozen connecting bridges between the cubes to be frozen. To further assist in this and to assure substantial equilibrium and to minimize the meniscus effect at the weirs, the cam track 133 is provided with a section 222 following the completion of the water fill located between the positions 270° and 330° which applies through the roller follower 131, the sector gear 127, the pinion 96 and the shaft 92 to the tray support 88, a turn of about 7° in both directions from the horizontal. This is done by providing a rise of .034" between 270° and 285° of the cam periphery and a fall in the cam periphery of .068" from 285° to 315° followed by a rise of .034" from 315° to 330°. The stop 163 will stop the clockwise turning of the rear end of the tray enforcing a 7° twist but permits a free counterclockwise turning. This slight turning of the front end of the tray in both directions through 7° accomplishes the substantial equal distribution of the water or other liquid to be frozen in all the pockets with a minimum level so that the amount in the weirs 82 is kept at a minimum.

The inner commutator circular segment 167 is arranged to have the end of its conducting path moved off of the spring contact 169 when the cam 135 reaches the 353° position. This deenergizes the synchronous clock motor 159 and stops all operation excepting the cooling and freezing of the liquid in the tray 76. The motor 159 and the drive mechanism have enough inertia to drift or coast for 6° or 7° following deenergization. However, prior to this time at a position of approximately 353°, the contact 181 makes contact with the conducting segment of the commutator ring 179. This provides energization through the 115 volt potential 60/50 cycle supply conductor L-1 and the conductor 224 connecting with the spring contact 177 which continuously contacts the continuous conductor ring 175 which connects with the conducting segment of the ring 179 to supply current through the spring contact 181 and the conductor 226 on the printed circuit board with the primary winding 228 of the transformer 230. The second terminal of the primary winding connects through the conductor 232 to the supply conductor L-2. During this time the cold below freezing temperature air circulating in the compartment 24 gradually cools the liquid in the tray 76 and begins the freezing thereof.

The transformer 230 has a secondary winding 234 having one terminal connected by the conductor 236 to a switch 238 which is shown in detail in FIGURE 11. This switch 238 is of a sliding bridge type adapted in its upper position to bridge the printed circuit conductors 236 and 240. This switch 238 is connected to a cast plastic operator 242 which is slidably mounted in the drive mechanism casing as illustrated in FIGURES 6 and 8–11. This plastic operator 242 is spring pressed downwardly by the compression type coil spring 244 which is lodged in a recess in the operator 242 and presses against the edge of the printed circuit board 183 as shown in FIGURE 11. This forces the operator 242 against a plate 246 on top of the front end of a plastic collector bin 248. This plastic collector bin 248 is provided with an outwardly projecting rim 250 which overlies an inwardly projecting slideway 252 provided at the bottom of the sheetmetal frame 56 at the sides 58 and 64. The bin 248 is pivoted at the rear by providing the projections 254 at the rear of the rim 250. The bin 248 is provided with bearing projections 255 to minimize friction with the sheetmetal frame 56.

At the front of the rim 250, the bin is provided with resilient support means in the form of a pair of wire springs 256, one located on each side. The springs 256 include an anchored end 258 projecting into the interior of the handle 260 of the bin and a helically curled portion 262 located in a notch behind the handle 260 and in front of the front wall 264 of the bin 248. The spring 256 also includes a long portion extending rearwardly from the coiled helical portion 62 provided with an upward offset end 266 normally pressing downwardly on a ledge 268 beneath an opening 270 in the rim 250. The long portion 272 of the spring 256 beneath the offset portion 266 rests on the front portion of the slideway 252. As long as the portion 272 of the spring 256 raises the front end of the bin 248 so as to raise the operator 242 to the position shown in FIGURE 6 with the offset portion 266 of the spring 256 pressing against the projection 268, the slide switch 238 will be held in the upper closed position. However, when the bin 248 reaches its capacity of about 120 cubes, the lower portion of the spring 256 will be deflected upwardly relative to the rim 250 which will allow the front end of the bin 248 to move downwardly allowing the operator 242 to be moved downwardly with it under the force of the spring 244 which will carry the slide switch 238 downwardly so as to open the circuit connected to the secondary winding 234. This will stop the operation of the ice making machine at the normal zero stopping and starting point so as to prevent overfilling of the collector bin 248.

The conductor 240 connects a diode rectifier 274 which is connected by the short conductor 276 with one end of a resistor 278. The opposite end of the resistor 278 connects to a conductor 280 providing a direct connection with one terminal of a Zener diode 282, a capacitor 284 and a resistor 286. The second terminals of both the Zener diode 282 and the capacitor 284 connect with the conductor 288 connecting to the second terminal of the secondary winding 234. In this circuit the transformer 230 has a primary voltage of 120 volts A.C. and a secondary voltage of 28 to 30 volts which is rectified to provide 15 ma. The diode 274 may be of a type IN-462A, with a forward current at 1 v. of the equivalent of 100 ma./D.C. The resistor 278 may have a resistance of 180 ohms and a capacity of 5 watts. The Zener diode may be a 1N723 type which will regulate at 24 v. D.C. and have a maximum rating of 15 ma. The capacitor may be the type TY13BH-K having a rating of 22 microfarads. The resistor 286 may have a resistance of 1200 ohms.

This resistor 286 is connected by the conductor 290 to the variable resistance 292. This is a wire wound variable resistance having a maximum resistance of 2000 ohms and a rating of 2 to 3 watts. It is connected by the conductor 294 to the coil 296 of a relay switch 298. The relay coil 296 is connected by a conductor 321 to a parallel circuit compensating network consisting of a resistance 323 in parallel with a compensating thermistor 325. The thermistor 325 is responsive to the temperature of the compartment 24. The second terminal of this network and of the resistor 323 and the thermistor 325 is connected to the conductor 288. The resistor 323 is of the carbon type and has a resistance of 300 ohms. The thermistor 325 is type 763F-42 having a resistance of 1200 ohms at 25° F. Its dissipation constant is 10 milliwatts per degree centigrade and its time constant is 30 seconds. The relay 296 is of the reed type having a coil resistance of 4500 to 5000 ohms D.C. and a pull in current of 2 ma. It will open on deenergization of the coil. The one terminal of the relay switch 298 is connected by the conductor 327 to the spring contact 169 as well as to one terminal of the motor stator 159. The other terminal of the relay switch 298 is connected by the conductors 329 and 224 to the line supply conductor L-1.

Figure 9:
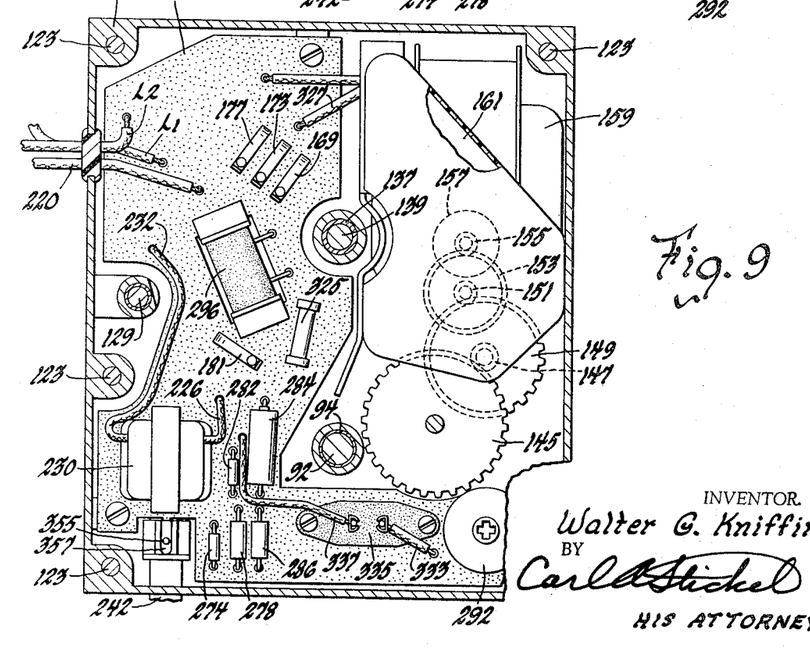
FIGURE 9 is a transverse fragmentary vertical sectional view through the drive mechanism taken along the line 9—9 of FIGURE 6.

The conductor 294 also connects to the sensing thermistor 331 which in turn is connected to the conductor 288. Particularly the conductor 294 is connected through a conductor 333 (see FIGS. 8 and 9) with one terminal of a receptacle 335. The second terminal of the receptacle 335 is connected by the conductor 337 with the conductor 288. The receptacle 335 receives the plug connector 339 having its terminals connected by the conductors 341 and 343 (see FIGS. 6 and 7) to the thermistor 331 which is located in a recess 345 in the wall 347 of the tray 76. Extending over this thermistor is a thin copper heat collector disk 349 which extends beyond the thermistor over the adjacent portions of the outer surface of the wall 347 to increase the heat transfer from the thermistor 331 through the wall 347 into the adjacent compartment. The heat collector disk 349 and the thermistor 331 are insulated from the cold circulating air by a foam insulating member 351 which fills the hollow space between the wall 347 and the adjacent compartment wall so as to effectively insulate the thermistor 331. This foam insulating piece is held in place by an extruded rod 353 formed integral with the tray 76 and having its end portion heat formed into a head sufficiently large to hold the foam insulation piece 351 in place.

With this arrangement, when the spring contact 169 is open circuited and the spring contact 181 is closed circuited, the motor stator 159 will be deenergized. If the bin switch 238 is closed, during this period the restarting of the motor 159 will depend on the freezing of the liquid in the ice tray 76. According to my invention an especially sensitive detecting arrangement is provided. As illustrated, an arrangement is provided for maintaining the detector thermistor 331 at substantially the same temperature as the liquid in the tray through the use of the recess 345 in the wall and the heat conductor disk 349.

The Zener diode 282 and the capacitor 284 provide a regulated voltage for the rectified current so that it is substantially unaffected by supply voltage variations. The variable resistance 292 is adjusted so that when the thermistor 331 is cooled to a temperature of about 23°, its resistance will be high enough and the current flow through the resistance 292 and the relay coil 296 will be great enough to cause the closing of the relay switch 298. This closing of the relay switch 298 will close a parallel supply circuit for the motor stator 159 which will restart the motor for the ejection cycle. This will also restart the movement of the commutator 165 causing the spring contact 167 to again make contact with the conducting portion of the No. 1 commutating strip 167 to restore the normal supply circuit for the motor stator 159. The motor 159 will then continue throughout the remainder of the ejection and water filling cycles without interruption to the zero stopping point.

The thermistor 331 is intended to be responsive to the contents of the tray or mold 76 at all times to detect the completion of the freezing of the liquid therein. However it is also subject to the temperature influence of the cold air circulating in the compartment 24 which surrounds the tray or mold 76. Since the temperature of this air is between +11 and −2° F. which is far below the temperature of 23° F. at which the thermistor 331 is intended to operate, there must be made arrangements to prevent the ejection cycle from being prematurely initiated merely by this cold air in the compartment 24. The premature initiation of the ejection cycle could cause the dumping of unfrozen liquid into the collector bin 248.

The commutator segment 179 only contacts the spring contact 181 to energize the detection circuit including the thermistor 331 only between the commutator positions of 345 and 35° so that during all other positions the initiation of an ejection cycle is effectively prevented. The position of 345° at which the commutator segment 179 first contacts the spring contact 181 to provide for the energization of the detector system follows the fill-ing of the tray or mold 76. In order that this filling can be relied upon to raise the temperature of the thermistor 331 in this period above its operating temperature of 23° F. prior to the contact of the segment 179 with the contact 181, the fill tube 195 is arranged to discharge all of the liquid into the compartment or pocket 346 having the thermistor 331 located in its wall 347. This will provide 15 times the warming effect than could be provided with only the liquid deposited in the one compartment 346. The heat collector disk 349 also assists in the raising of the temperature of the thermistor 331. This is further assisted by the insulation 351 which reduces the effect of the cold air in the compartment 24 on the thermistor 331. Through all these expedients the temperature of the thermistor of 331 is maintained above its operating temperature of 23° F., until the liquid is completely frozen in the tray or compartment 76.

The restarting of the motor 159 at the end of the freezing period is prevented whenever the bin 248 is filled with about 120 cubes. This will cause the springs 256 to be deflected under the weight of the cubes thereby moving the collector bin 248 and the operator 242 downwardly to open the bin switch 238. This opening of the bin switch 238 will prevent the energization of the relay coil 296 and the closing of the relay contact 298 so that the motor stator 159 will not be energized until some or all of the frozen cubes are removed from the collector bin 248.

According to another feature of my invention, means are provided during every ejection cycle for automatically operating the bin switch 238 and its operator 242 to the open circuit position. This will assure that there will be no mechanical sticking or freezing of either switch 238 or its operator 342 or the bin collector 248 to prevent the stopping of the machine when the collector bin 248 is filled. To do this, I have provided the sector gear 127 with a wire link connector 355 which extends to the operator 242 of the switch 238. The operator 242 is provided with a slot 357 for receiving the lower end of this link connector. When the roller follower 131 is moved outwardly by the highest portions of the cam track 133, the link 355 will be moved downwardly far enough to engage the lower end of the slot 357 to move the operator 242 downwardly far enough to open the bin switch 238. This will not interfere with the ejection cycle of the machine and will not stop the motor 159 since the engagements of the commutator contacts 167, 169 will continue the energization of the motor. The link 355 will be raised during the return of the mold or tray 76 to the horizontal position so that the bin switch 238 will be reclosed before the conductor strip 167 moves its conducting portion away from the spring contact 169 at the normal stopping point for the machine. The bin switch 238 is therefore only tested during this period to assure that it is not frozen or stuck without interfering with the operation of the machine. The bin switch 238 can only stop the machine by the deflection of the bin 248 when it is filled with the normal capacity of 120 frozen cubes.

In FIGURE 14 a modified form of the invention is shown in which a different form of ice mold or tray 420 is provided. This tray has substantially cylindrical walled compartments of the type illustrated in applicant's Patent 3,075,364 issued January 29, 1963. This tray 420 is provided with end supports 422 which are similarly mounted at the opposite ends like the tray 76. It differs from the first form employing the tray 76 in that the housing 54 is provided with a stationary ejector finger 424 which is engaged by a frozen cube 426 which is thereby mechanically ejected when the tray 420 is turned counterclockwise with the rear support 422 engaging a stop 432 projecting from the rear of the frame 434, as illustrated in FIGURE 14. The compartment illustrated in FIGURE 14 may have a thermistor 428 mounted on its walls and covered by a foam insulating member 430. This foam insulating member is held by a rod formed integral with the adjacent wall of the tray 420 which has its outer end formed into a heat formed rivet head 431. This arrangement assures the positive ejection of the frozen cube from the tray pocket used for detection of the freezing cycle. This prevents irregular operation of the machine due to the failure of the tray to eject the frozen cube from the pocket containing the controlling thermistor such as the thermistor 331.

While the embodiment of the present invention as herein disclosed, constitutes a preferred form, it is to be understood that other forms might be adopted.

What is claimed is as follows:

1. An automatic liquid freezer including a mold having liquid holding compartments, means for freezing liquid in said mold, means for discharging frozen liquid from said mold, collecting means for collecting said frozen liquid, means comprising resilient means for supporting said collecting means, means responsive to a deflection of said resilient means for stopping said means for discharging frozen liquid, and positive force means coincidentally responsive to the operation of and operably connected to said means for discharging frozen liquid for positively deflecting said collecting means.

2. An automatic liquid freezer including a mold having liquid holding compartments, means for freezing liquid in said mold, said mold having wall portions adjacent said compartments, a temperature responsive device in contact with one of said wall portions, a thin sheetmetal heat conductor having a large area overlying said device and a substantial portion of said mold, an insulating cover for said heat conductor, and means controlled by said temperature responsive device for discharging frozen liquid from said mold.

3. An automatic liquid freezer including a mold having liquid holding compartments, means for freezing liquid in said mold, a motor, temperature responsive switch means, responsive to a low temperature of said mold for starting said motor, first means operated by said motor for shunting said temperature responsive switch means to continue operation of said motor for a period, second means operated by said motor for discharging frozen liquid from said mold, third means operated by said motor for supplying liquid to be frozen to said mold, collecting means for collecting frozen liquid discharged by said mold, means comprising resilient means for supporting said collecting means, means responsive to the deflection of said resilient means for stopping said motor after said period, and fourth means operated by said motor for deflecting said resilient means during the operation of said first means.

4. An automatic liquid freezer including a mold having liquid holding compartments having connecting weirs, cooling means for cooling said mold to below freezing temperatures to freeze liquid in said compartments, ejecting means for discharging frozen liquid from said compartments, temperature responsive means responsive to a low temperature of one of said compartments for initiating operation of said ejecting means, and means for preventing premature operation of said ejecting means comprising means for insulating said temperature responsive means from said cooling means and means for directing substantially all the liquid filling charge to said one compartment for distribution to fill the remaining compartments of said mold.

5. An automatic liquid freezer including a mold having liquid holding compartments, means for freezing liquid in said mold, means for discharging frozen liquid from said mold, collecting means for collecting said frozen liquid, means comprising resilient means for supporting said collecting means, means responsive to a deflection of said resilient means for stopping said means for discharging frozen liquid, positive force means responsive to the operation of and operably connected to said means for discharging frozen liquid for positively deflecting said collecting means, and means effective during said deflection of said resilient means by said positive force means for preventing the stopping of said means for discharging frozen liquid.

6. An automatic liquid freezer including a mold having liquid holding compartments, means for freezing liquid in said mold, a motor, discharging means operated by said motor for discharging frozen liquid from said mold, collecting means for collecting said frozen liquid, means comprising resilient means for supporting said collecting means, means responsive to a deflection of said resilient means for stopping said motor, positive force transmitting means operated by said motor and extending between said motor and said collecting means for deflecting said resilient means during the operation of said discharging means, and means operated by said motor and effective during the operation of said force transmitting means for preventing the stopping of said motor.

7. An automatic liquid freezer including a mold having liquid holding compartments, means for freezing liquid in said mold, an electric drive motor, discharging means operated by said drive motor for discharging frozen liquid from said mold, collecting means for collecting said frozen liquid, means comprising resilient means for supporting said collecting means, first switch means connected in series with said drive motor for controlling said drive motor, means responsive to a deflection of said resilient means for opening said first switch means, positive force transmitting means operated by said drive motor coincidentally to discharging frozen liquid from said mold, said positive force transmitting means extending between said motor and said collecting means for deflecting said resilient means, and means comprising a shunt circuit containing a second switch means for shunting said first switch means, said motor having means for closing said second switch means to shunt said first switch means during the deflection of said resilient means.

8. An automatic liquid freezer including a longitudinally extending mold having a plurality of separate spaced liquid holding compartments arranged in a plurality of longitudinally extending rows, said mold having ends adjacent the ends of said rows, said mold being of resilient material and having webs extending longitudinally between the spaced compartments in said plurality of said longitudinally extending rows, separate rotatable support means connected to the ends of said mold, means for filling and freezing liquid in the compartments of said mold, and means for inverting and substantially uniformly longitudinally twisting said mold upon said support means to discharge frozen liquid from said mold, said webs between said compartments assisting in attaining a substantial uniformity in the twist of the mold.

References Cited by the Examiner

UNITED STATES PATENTS

| | | | |
|---|---|---|---|
| 1,724,528 | 8/1929 | Springer. | |
| 2,484,017 | 10/1949 | Copeman | 62—344 |
| 2,981,079 | 4/1961 | Fink | 62—137 X |
| 2,994,205 | 8/1961 | Brubaker et al. | 62—137 X |
| 2,996,895 | 8/1961 | Lippincott | 62—340 X |
| 3,008,331 | 11/1961 | Chase. | |
| 3,026,684 | 3/1962 | Chace | 62—353 X |
| 3,071,933 | 1/1963 | Shoemaker | 62—71 |
| 3,089,312 | 5/1963 | Harle | 62—344 X |
| 3,163,019 | 12/1964 | Hall | 62—137 |
| 3,217,506 | 11/1965 | Beck et al. | 62—137 |
| 3,217,510 | 11/1965 | Kniffin et al. | 62—353 |

ROBERT A. O'LEARY, *Primary Examiner.*

W. E. WAYNER, *Assistant Examiner.*